United States Patent [19]

Villeneuve

[11] Patent Number: 5,056,669

[45] Date of Patent: Oct. 15, 1991

[54] CASSETTE STORAGE SYSTEM

[76] Inventor: Raymond J. J. Villeneuve, R.R. #1, Oro Station, Ontario, Canada, L0L 2E0

[21] Appl. No.: 540,432

[22] Filed: Jun. 15, 1990

[51] Int. Cl.$^5$ .............................................. A47B 81/06
[52] U.S. Cl. ...................................... 211/40; 211/13; 312/234.4
[58] Field of Search ....................... 211/40, 89, 13, 94, 211/194; 312/234.4

[56] References Cited

U.S. PATENT DOCUMENTS

| | | | |
|---|---|---|---|
| 2,630,096 | 3/1953 | Conley | 312/234.4 X |
| 2,710,694 | 6/1955 | Carr | 211/89 X |
| 2,916,159 | 12/1959 | O'Neill | 211/89 |
| 3,425,568 | 2/1969 | Albright | 211/94 X |
| 4,239,306 | 12/1980 | Klaus | 211/194 X |
| 4,257,524 | 3/1981 | Yonkers et al. | 211/13 X |
| 4,793,665 | 12/1988 | King | 211/40 X |

*Primary Examiner*—Alvin C. Chin-Shue
*Attorney, Agent, or Firm*—Caesar, Rivise, Bernstein, Cohen & Pokotilow, Ltd.

[57] ABSTRACT

High density, rapid access storage of cassette modules is provided by way of a storage unit in which the modules are supported in side by side edge-on orientation, being supported at the diagonally opposed front top and rear lower corners, and having freedom for lateral sliding movement while thus secured within the storage unit to afford finder access to a selected cassette, and to permit insertion and removal by handfulls. Release of a selected cassette is readily effected by upward raising of the cassette within a top clearance space provided thereover, thus freeing the rear lower corner from the storage unit, for frontal withdrawal of the cassette module from the storage unit. The storage unit comprises a pair of end support means in mutually spaced apart, facing relation for supporting the unit in substantially vertical orientation, having one or more module support sections extending laterally in secured relation between the end support means, the support section having substantially continuous laterally planar upper and lower support surfaces to engage diagonally opposed corners of the modules in stable supporting relation therewith, in use to permit unrestricted lateral displacement of modules in sliding relation therealong, and providing a clearance space above, for upward displacement of the modules therein, to release contact with the lower support surface and thus permit insertion and withdrawal of the module from the storage unit. The storage units are each specificly sized to one size of module, and can cover the full spectrum of cassette or other module sizes, the units also being stackable to form a library.

12 Claims, 3 Drawing Sheets

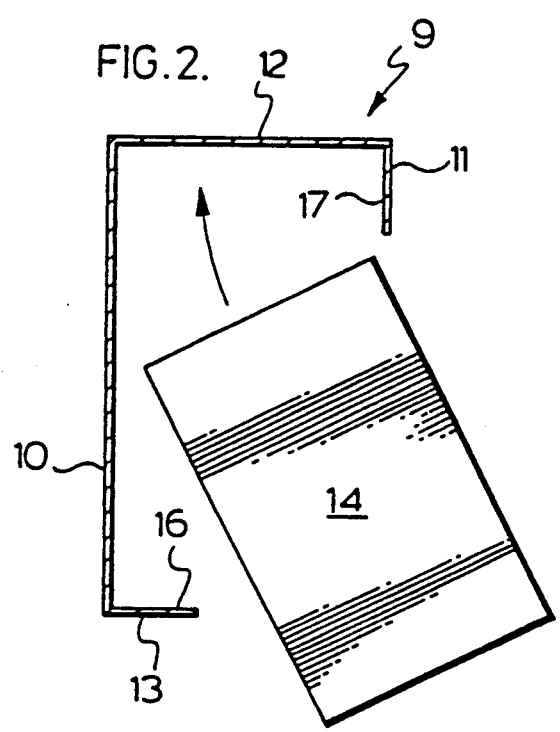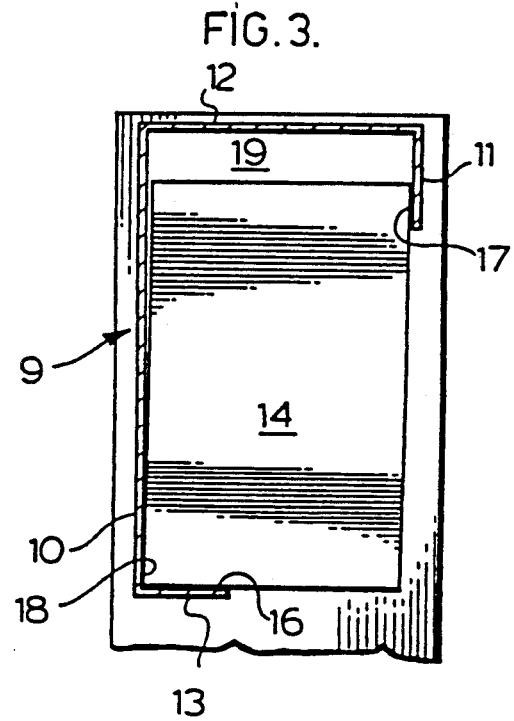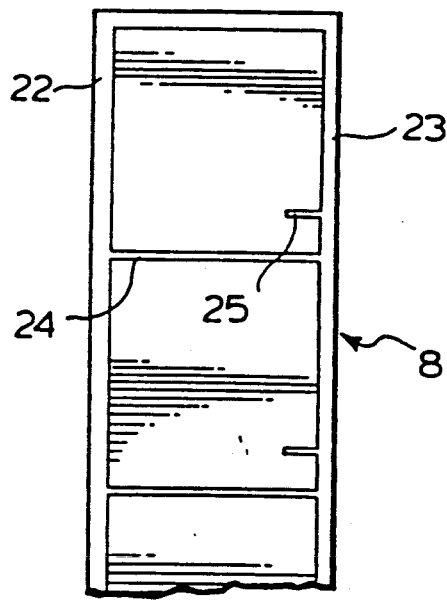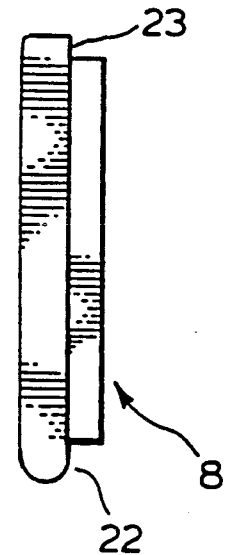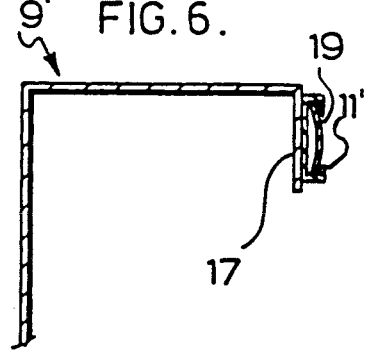

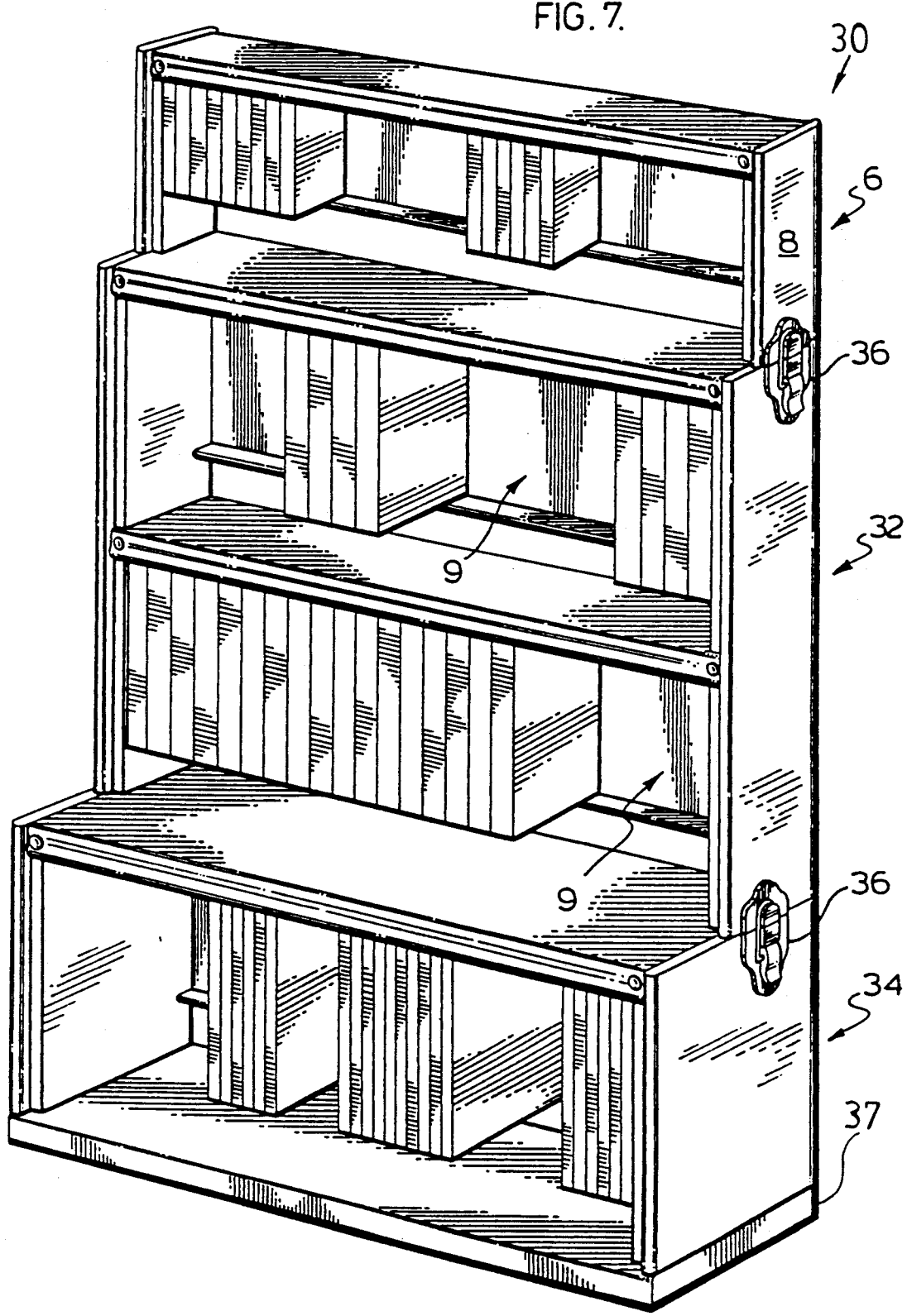

CASSETTE STORAGE SYSTEM

FIELD OF THE INVENTION

This invention is directed to a module storage system, and in particular to storage units for the bulk storage of standard sized modules such as tape cassettes, to permit high density storage with rapid elective dispensing of selected modules, or storage and retrieval by the handful.

BACKGROUND TO THE INVENTION

The growth of home entertainment has introduced widespread use of tape cassettes.

These cassettes come in a wide ringe of standard sizes, there being smaller audio tape cassettes for use in recording and playing music by way of tape recorders, and larger VCR tape cassettes for video recordings. The range of sizes formates suitable for such modular storage is extended by the use of protective covers such as paper jackets, book-type cases, etc. Also suitable for such modular storage are BETA TM format video tapes, game video tapes such as NINTENDO TM and the slim jackets of computer discs, in a range of sizes.

The efficient organization of these various cases and cassettes has presented problems. Certain prior solutions have included, in the case of audio tapes, for instance, cassette boxes or carrying cases, wherein an enclosed box, having a cover therefor contains a number of cassettes in standing, compartmented relation therein. While suited for transportation, or the use in cars and other vehicles, etc., this type of storage is not particularly convenient for normal domestic use.

Storage of standard sized articles in individual receptacles or in racks is very well known, such as books in bookcases.

For instance, U.S. Pat. No. 2,102,083 MacDonald shows a receptacle for holding an individual cylindrical container, for ready, frontal access thereto.

In U.S. Pat. No. 3,068,019 Schuster a plurality of separate trays are individually supported by the respective rearward edges thereof. This arrangement does not lend itself to close storage of articles, owing to the absence of any degree of lateral freedom, while requiring a free rear top edge of the tray by which to engage the respective clips.

U.S. Pat. No. 2,916,159 O'Neill shows the use of a series of mounting clips to provide shock and vibration mounting of electrical components such as transistors, wherein each component has an individual clip, including a resilient or spring-like top portion to clamp the respective electronic component in restrained relation therewith, and wing like lateral restraint elements to preclude lateral displacement.

U.S. Pat. No. 3,591,120 FIETZER et al. shows the use of a wire basket-like enclosure for the individual insertion and retention of a single box, in drop-in relation therein, for top access thereto.

U.S. Pat. No. 3,702,132 FITES et al. shows a portable cassette container having a ladder-like shelf arrangement wherein pairs of cassettes are displayed in face forward, laterally inserted slide-in relation at each level, being retained by way of a resilient, cassette gripping shelf portion in side-by-side outward facing orientation, wherein frontward removal is precluded by the proximity of the overlying, next adjacent shelf portion. This arrangement is of insufficient storage density to meet present needs, owing to the front orientation of the cassettes with associated required large lateral clearances for removing and replacing the cassettes, which impedes sufficiently rapid access thereto.

U.S. Pat. No. 4,257,524 Yonkers et al. shows a suspended rack unit having a series of adjacent cassette receptacles, divided by lateral partitions, and having spring loading means to secure a rear lower corner of a respective cassette in downward pressed engagement with an individual "heel" recess. This construction is a comparatively high cost, complex arrangement, apparently based upon injection molding of the rack unit body. In use, such units require the specific location of a cassette in precise, inserted relation between a pair of lateral partitions, and preclude mass removal and re-insertion by the handful.

SUMMARY OF THE INVENTION

The present invention provides a module storage unit for elective, rapid dispensing of selected modules from among a plurality thereof that may be stored within the unit, the unit comprising end support means in mutually spaced relation, to support the unit in substantially vertical orientation; and having at least one module support section extending in supported relation between the end support means, the support section having substantially continuous, laterally planar uppper and lower support surfaces in use to engage diagonally opposed corner portions of the modules in stable supporting relation therewith, to permit high density, side by side storage, with unrestricted lateral displacement of the modules in sliding relation therealong, and providing a clearance above the modules, for upward displacement of a module therein to permit ready frontward removal of the module from the storage unit by disengagement of the lower rear corner thereof from the lower support surface. The unit also permits mass removal and insertion of modules, by the handful, as well as in-unit sorting in indexed relation. This is of particular importance for commercial displays or mass storage, while also being very useful to domestic users.

The subject storage unit lends itself particularly to low cost production, in that the end support means may utilize a low cost shaped section of wood or extruded plastic, while the module support section may be of extruded plastic or roll formed or press formed sheet material.

The use of a minimal number of simple fasteners such as nails or studs secures the end support means and the module support section in rigid, mutually bracing joined relation.

The use of a one piece module support section having a unitary top and back intermediate joining portions connecting the upper module support surface with the lower module support surface provides a shelf-like top surface and an encompassing back, serving to protect the cassettes, discs or other forms of module from dust settlement etc, thus enabling safe storage without the necessity of dust covers or other sleeves. This construction also provides a stiff, stable structure that may be free standing, or which may be stacked, one upon another.

Alternatively, a multiple unit may be manufactured, wherein a single pair of end support means have a series of support sections secured thereto in mutually spaced relation, in the fashion of shelving, for enhanced storage capacity.

Furthermore, the construction particularly lends itself to a library incorporating storage units in conveniently stacked relation, for a wide range of module sizes, each unit being sized for a respective size of module.

Owing to the method of manufacture adopted, low cost mass produced components may be manufactured by extrusion, roll forming or break-bending.

In a preferred embodiment the module support portion comprises, in section, a partial rectangle, constituting in effect, a rectangle having removed therefrom a lower portion of the front face together with the connecting forward portion of the bottom face. Being of a size to accommodate a cassette or other rectangular section module of specified size in inserted relation within the section, the provision of a top clearance within the unit "rectangle", located above the position occupied by tops of the cassettes or other modules, enables both individual and mass insertion and removal of the cassettes or other modules, by upward displacement into the clearance space, thereby permitting placement or removal of the modules relative to the small rear shelf portion of the unit.

The transversely extending lower edge of the module upper support surface extends below the level of the top of the module, when in place, to engage the forward upper corner surface thereof and thus preclude forward tipping of the module.

The lower support surface generally extends forward, substantially horizontally, to form a small shelf, to engage the lower rear corner of the module, along which shelf the modules may slide, laterally. The utilization of this lateral freedom of positioning facilitates ready sorting and arrangement of the modules, while labeling of the thus librared unit contents is made possible by the provision of a storage unit embodiment having a slip-in labeling groove or grooves by means of which labeling cards or strips may be readily positioned on the front face of the unit, above the respective modules to which the labels apply.

BRIEF DESCRIPTION OF THE DRAWINGS

Certain embodiments of the invention are described, for purposes of illustration, without limitation of the invention thereto, reference being made to the accompanying drawings, wherein:

FIG. 2 is a cross section of a single one of the module support sections of FIG. 1, showing a cassette module partially inserted therein;

FIG. 3 is a like view to FIG. 2 with the cassette module installed within the unit;

FIG. 4 is an end elevation, at a reduced scale, of one of the unit end support members;

FIG. 5 is an enlarge plan view of the end support member of FIG. 4;

FIG. 6 is a partial view corresponding to FIG. 2 showing provision for a slip in label; and FIG. 7 is perspective view showing an assembly of three different storage units, each for a selected size of module, arranged as a library.

DETAILED DESCRIPTION OF THE INVENTION

Figure 1:
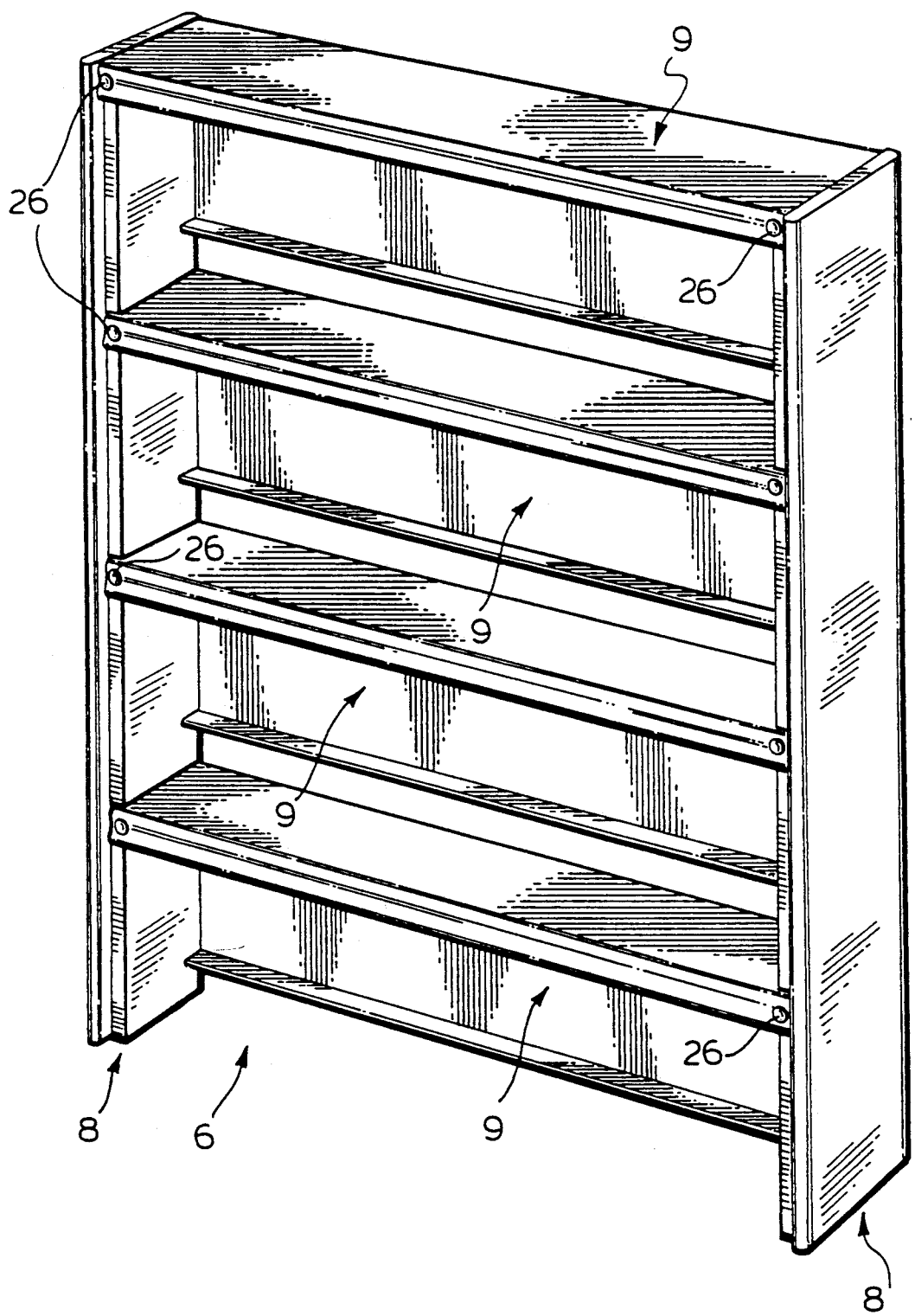
FIG. 1 is a perspective view of a multiple "shelf" storage unit in accordance with the invention.

Referring to FIG. 1 the illustrated embodiment of storage unit 6 of the present invention comprises a pair of opposed end support means 8 having four support sections 9 secured therebetween, The end support means 8 has level, planar, top and bottom surfaces to facilitate free standing or stacking arrangements.

Referring to FIGS. 2 and 3, each support section 9 has a substantially vertical back portion 10, and an upper front lip portion 11 depending downwardly from a horizontal cover portion 12.

A forwardly extending lower shelf portion 13 connects with the back portion 10.

An upper surface 16 of the shelf portion 13, and an inner surface 17 of the upper lip portion 11 constitute laterally continuous slide surfaces by which the cassette modules are restrained and along which they may be transversely displaced within the unit 6.

Thus, with particular reference to FIG. 3 it will be appreciated that the stable retention of a cassette module 14 within the storage unit 6 relies upon him the sum of the clockwise turning moments provided by the mass of module 14, acting through its centre of gravity and the reaction force provided by the inner support surface 16, balanced by the anti-clockwise turning moment provided by the reaction force acting at the inner surface 17.

Insertion of a module 14 into the storage unit 6 relies upon upward insertion of the upper end of module 14 into the "spare" space 19 of FIG. 3 such that the heel 18 of module 14 can clear the shelf portion 13, and be moved rearwardly and downwardly into the stored position illustrated.

Removal of the module 14 from the storage unit 6 comprises a reversal of the insertion steps.

It will be understood that the storage position shown in FIG. 3 is a stable condition, wherein the turning moment forces acting on the module 14 tend to maintain it in the position illustrated. Lateral bodily displacement of a module 14 within the unit 6 does not change the stabilizing forces acting upon the module 14.

In general use, a first module 14 is readily removed from the respective section 9 by upward finger pressure on the bottom of the module and forward-drawing of the heel portion 18, from off the support surface 16. Subsequent modules 14 may be slid laterally, to afford finger gripping access to the lateral sides of a selected module 14, for elective removal thereof from the storage unit 6. Furthermore, with the provision of lateral finger access, the contents of any selected unit or "shelf" may be removed or reinserted by handfuls. This is of greater importance in commerical or library use.

Referring to FIGS. 4 and 5, the end support means 8 comprises a section having recessed front and rear surfaces 22, 23 respectively and a series of transverse grooves 24 and partial grooves 25 recessed therein, to receive end portions of the shelf portion 13 and top 12 in inserted relation therein.

Referring to FIG. 6, the support section 9' is provided with a C-section 11' by means of which a suitable indexing means such as a card or strip label 19 may be retained.

It will be seen that the opposed ends of the portions 10, 11, 12, and 13 of each support section 8 of FIG. 2 index fairly precisely with the recessed surfaces 22, 23 and grooves 24 and 25 respectively of FIG. 4, to facilitate rapid and accurate assembly of the components of the storage unit 6 prior to securement thereof by insertion of the fastening members 26, at the front, and securing nails in the rear.

It will be understood that the support sections 9, while constituting a stiff girder formation when secured between the end support means 8, is sufficiently flexible to promote rapid and easy assembly of the components.

Referring to FIG. 7 it will be seen that a typical "library" 30 having three tiers of storage units 6, 32 and 34 respectively may be formed. In the illustrated embodiment the units are fastened together by means of buckle clips 36. Alternatively, with the provision of hangar loops (not shown) secured to the rear upper portions of the respective units, they may be readily hung in suspended relation from a supporting wall or other suitable structure.

The lower unit 34 is provided with a base plate 37, secured by a suitable panel nail, (not shown) and may be provided with a foam layer in order to cushion the weight of the larger cassettes that may be stored there.

It will be understood that each storage unit may comprise a single support section or have two or three or more such sections.

The embodiments of the invention in which an exclusive property or privilege is claimed are defined as follows:

1. A module storage unit for elective arrangement and dispensing of selected modules from a plurality thereof when stored within the unit, comprising:
   end support means in mutually spaced apart, facing relation to support said unit in substantially vertical orientation;
   at least one module support section extending in supported relation between said end support means, said support section having planar, substantially laterally continuous upper and lower support surfaces of sufficient lateral extent in use to accommodate a plurality of said modules in side by side, edge exposing relation, wherein said support surfaces engage at the rear of a bottom surface and the top of a front surface of diagonally opposed corner portions of each of said modules, in stable supporting relations therewith;
   in use to permit side by side abutting storage therein, with free lateral displacement of said modules singly or in multiples in sliding relation therealong, and providing a clearance above said modules, to permit upward displacement of said module therein, for release of said module from restraint by said bottom surface, on insertion and removal of said modules singly or in multiples from the unit.

2. A module storage unit as set forth in claim 1 wherein said module support section comprises a unitary section having top and back cover portions, said planar upper support surface depending downwardly from said top cover portion, said lower support surface extending forwardly from said back cover portion.

3. The module storage unit as set forth in claim 1, said end support means having index surfaces thereon to receive end portions of said module support section in indexed, positioned relation therewith 4. The storage unit as set forth in claim 1, having a plurality of said module support sections in mutually spaced relation extending thereacross.

5. The storage unit as set forth in claim 3 wherein said index surfaces include recessed planar surface portions, to receive said module support section end portions in secured attachment thereto.

6. The storage unit as set forth in claim 5, including fastening means penetrating said module support section and said end support means in joining relation therewith.

7. The storage unit as set forth in claim 1, said end support means having horizontal upper and lower end surfaces to facilitate free standing and stacked disposition of said unit.

8. The storage unit as set forth in claim 1, said laterally planar upper support surface having label attachment means on the outer surface thereof, in use to receive indexing means in inserted relation therein.

9. The storage unit as set forth in claim 8, said label attachment means comprising an outward and upwardly extending lip portion of said laterally planar upper support surface, to receive said indexing means in inserted relation therein.

10. The storage unit as set forth in claim 1, said support section facilitating ready access thereto, permitting in use the mass removal and insertion of said modules by the handful.

11. The module storage unit as set forth in claim 1, in combination with at least on other said unit for a larger size of module, said units being located in mutually stacked relation to form a library for said modules.

12. The combination as set forth in claim 11, including fastening means for securing said storage units in said mutually stacked relation.

* * * * *